United States Patent

Wright

[11] Patent Number: 5,168,649
[45] Date of Patent: Dec. 8, 1992

[54] TURKEY DECOY

[76] Inventor: David Wright, R. R. #1, Box 453, Simpson, Ill. 62985

[21] Appl. No.: 838,524

[22] Filed: Feb. 19, 1992

[51] Int. Cl.$^5$ ............................................. A01M 31/06
[52] U.S. Cl. ................................................. 43/2; 43/2
[58] Field of Search ................................... 43/2, 3, 1

[56] References Cited

U.S. PATENT DOCUMENTS

| | | |
|---|---|---|
| 1,831,286 | 11/1931 | Chelini . |
| 2,256,778 | 9/1941 | Lundgren .................. 43/3 |
| 2,434,335 | 1/1948 | Signalness . |
| 2,457,295 | 12/1948 | Woodhead . |
| 2,663,108 | 12/1953 | Dixon et al. .............. 43/3 |
| 2,752,715 | 7/1956 | Miller . |
| 2,787,074 | 4/1957 | Miller . |
| 3,350,808 | 11/1967 | Mitchell . |
| 3,800,457 | 4/1974 | Barrett ..................... 43/3 |
| 3,927,485 | 12/1975 | Thorsnes, Jr. . |
| 4,893,428 | 1/1990 | Gagnon, Sr. ............. 43/3 |
| 4,896,448 | 1/1990 | Jackson . |
| 4,965,953 | 10/1990 | McKinney ................ 43/2 |
| 5,036,614 | 8/1991 | Jackson . |

Primary Examiner—Richard K. Seidel
Assistant Examiner—Chuck Y. Mah
Attorney, Agent, or Firm—Kalish & Gilster

[57] ABSTRACT

A turkey decoy is provided which includes a hen turkey body portion mounted on a support mechanism. The support mechanism is adapted for selective alteration of the position of the hen turkey body portion from a standing position to a position which imitates the mating posture of a hen turkey in order to lure tom turkeys out into a clearing for easier shooting thereof. The hen turkey body portion is mounted for selectively causing same to suddenly vertically drop straight downward in a non-pivotal fashion.

8 Claims, 1 Drawing Sheet

TURKEY DECOY

BACKGROUND AND SUMMARY OF THE INVENTION

This invention relates generally to the field of bird decoys, and, more specifically, to turkey decoys which can be caused to change position in such a manner as to imitate mating behavior.

It is a well-known experience among turkey hunters that the desired male ("tom") turkey will become "hung-up", hesitating in the bushes and undergrowth at the edge of a clearing, making a clear shot difficult. It has also been noted that the presence of a receptive female ("hen") turkey will frequently stimulate an otherwise hesitant tom to enter an open area for purposes of mating with the hen. It is typical of such mating-receptive hens that they will drop suddenly and silently from a standing position to a squatting or more-or-less reclined mating position, thus visually stimulating the tom to approach and mount for breeding.

Accordingly, the new turkey decoy takes the form of a hen turkey and is adapted for simply and selectively imitating a hen turkey's mating behavior by a quick, simple change of position, from standing to mating-ready, in order to attract the tom out, into a more open area to provide an easier shot at the tom.

Previously, most bird decoys consisted of unitary carved or molded birds which would be placed to sit still in a field or to float about on a pond or lake. Some decoys have been developed which can be caused to move either mechanically or by means of a small motor. These decoys are generally intended to attract birds by imitating feeding or wing-flapping behavior.

The majority of previously issued patents relating to movable bird decoys have to do with water fowl. For example, U.S. Pat. No. 1,831,286 to Chelini teaches a decoy duck which is anchored to the floor of a pond and connected to the anchor with an elaborate system of levers, cords and wheels to provide a decoy that will be disposed into the wind at all times and to permit raising the decoy and causing the outstretching of the wings, to simulate a live duck when it is about to raise itself from the water preparatory to flying.

U.S. Pat. No. 2,457,295, issued to Woodhead, discloses a duck decoy attached at the neck to an anchor by a string and pulley mechanism to provide a mechanism for causing the decoy to bob forwardly to simulate feeding. A similar mechanism is taught in U.S. Pat. No. 3,927,485, issued to Thorsnes, Jr., for a goose decoy in which the neck and head portion pivots relative to the decoy body. U.S. Pat. No. 2,434,335, to Signalness is also for a duck decoy which imitates feeding behavior, but is connected to an anchor by stiff levers, rather than by cords. The latter is, however, caused to move by selective manipulation of a cord.

U.S. Pat. No. 2,787,074 to Miller illustrates a waterfowl decoy mount having a floatable base penetrated by a rod and stake combination for either selective securement or floating. Manipulation of an attached string causes the decoy to tip backwardly with its head raised, or to tip in various directions, to simulate the motions of flapping or stretching of the wings. A similar motion is imitated by the decoy of a second U.S. Pat. to Miller, No. 2,752,715, in which the waterfowl decoy is mounted for pivoting on a horizontal rod on a buoyant base, which base may be selectively fixed, or permitted to float. Again, tilting is induced by operation of a cord.

In both Miller decoys the string is attached to the tail of the decoy bird to cause backward tilting by manually pulling on the string.

More recently, bird decoys have been developed with motorized movement. For example, U.S. Pat. No. 4,896,448, which issued to Jackson, discloses a waterfowl decoy with motor-driven wing movement. Another patent to Jackson, U.S. Pat. No. 5,036,614 teaches a decoy in the shape of a turkey which is staked to the ground and exhibits a feeding motion by pivoting forwardly and upwardly by operation of a motor. A similar device is taught by U.S. Pat. No. 3,350,808 to Mitchell, illustrating a goose decoy, also staked in position and having a motor operated moveable head and neck to simulate feeding movement of the bird. These motorized mechanisms all necessarily create a certain amount of noise which may frighten away the very birds hoped to be attracted. Moreover, the small motors used in the above, motorized decoys must, by their very nature, be subject to wear, breakdown and replacement, which latter may be impossible at the critical point in time, for example, if the breakdown occurs during use in the field.

None of the prior art decoys is directed toward substantially silent, simple, string-activated straight, non-pivotal vertical movement of an entire decoy on the mounting mechanism, nor toward the simulation of the specific mating response of the hen turkey (or any other bird), in assuming a reclined mating position. Rather, the patented decoys show only feeding or general flapping and bobbing types of movement.

Accordingly, it is among the objects of the present invention to provide a turkey decoy which simulates the mating behavior of the hen turkey in order to lure tom turkeys into an area which might otherwise be avoided and to thereby improve the possibility of a clear shot at the tom turkey.

It is further among the objects of the present invention to provide a turkey decoy of the character stated which is of simple construction, for facile set-up and operation, and that is relatively inexpensive, so as to be more readily available to more potential users.

It is still further among the objects of the present invention to provide a turkey decoy of the character stated which is not motorized and has no moving parts, so that it may be operated substantially silently and will not wear out over long periods of use.

Accordingly, in furtherance of the above objects, the present invention is, briefly, a turkey decoy which is adapted for imitation of the mating behavior of a hen turkey. The turkey decoy includes a hen turkey body portion adapted for mounting on a support mechanism, and a support mechanism for presenting the hen turkey body portion in a standing position in such a manner that the standing position of the hen turkey body portion can be selectively altered to a mating position to thereby attract male turkeys which are close enough to see the turkey decoy but are hesitating to approach same.

The new invention is also, briefly, a new turkey decoy as above and wherein the support mechanism has first and second elongated members. The first elongated member passes vertically, substantially centrally through the hen turkey body portion and is fixed thereto and the second elongated member is secured vertically to the ground and is interconnecting with the first elongated member in releasably secure fashion, to thereby provide a means for presenting said hen turkey body portion in a standing position which may be selectively altered to a mating position by selectively releasing the securement of said first elongated member to said second elongated member.

Other objects will be in part apparent and in part pointed out hereinbelow.

DESCRIPTION OF THE PREFERRED EMBODIMENT

Figure 1:
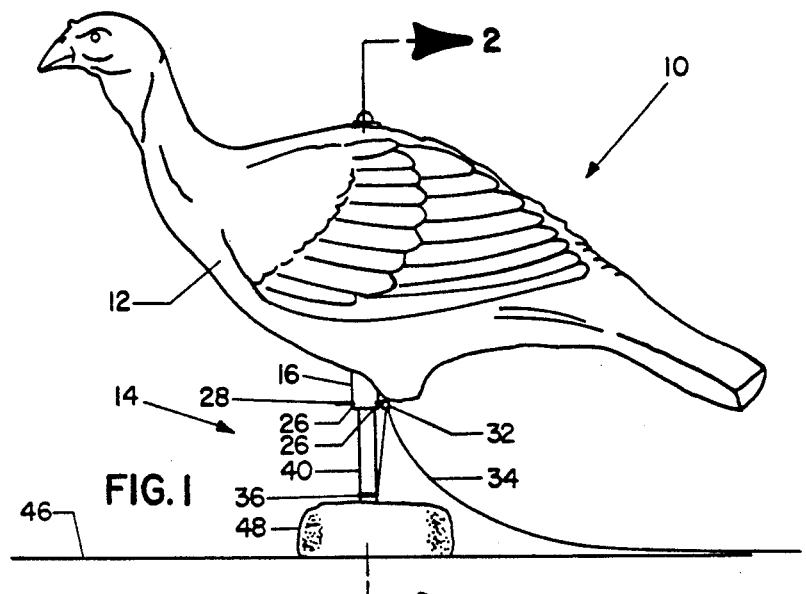
FIG. 1 is a side elevational view of a turkey decoy constructed in accordance with and embodying the present invention, in standing position.

Referring to the drawings, 10 generally designates a turkey decoy constructed in accordance with and embodying the present invention. Decoy 10 consists of a body 12 having the general form of a hen turkey mounted on a support mechanism 14. Decoy body 12 is preferably life sized and provided with a realistic appearance to best simulate a wild female turkey. Decoy body 12 may be made of any convenient material and may even be substantially solid, but is particularly preferred to be adapted from an existing hollow, colored plastic turkey decoy sold under the registered trademark CARRY-LITE of CARRY-LITE, Inc. However, other full-bodied turkey decoys can also be adapted for use as part of the invention, as hereafter described. As seen in the figures, there are no legs on turkey body 12 because such would interfere with the preferred action of support mechanism 14, to be described hereafter. Thus, if a preexisting decoy is modified for forming the new decoy 10, any legs must be removed.

Turkey body 12 is adapted (as by boring a hole or holes therethrough) for penetration approximately centrally and vertically by a dark colored, polyvinylchloride (pvc) tube 16 having an upper end 18 and a lower end 20 and a diameter of approximately ⅝ths of an inch. Pipe 16 is about one to two feet long, depending on the size of body 12. When positioned for normal operation of decoy 10, upper end 18 of tube 16 is disposed inside of and adjacent to the back of turkey body 12 and lower end 20 extends to a point beneath and adjacent to the belly of bird body 12 in what would otherwise be the general area of the legs of the decoy.

Tube 16 has tightly fitted at upper end 18 a wooden peg 21 (FIG. 2) which is about one inch long and is centrally, longitudinally penetrated by a screw 22 having the usual head and shaft. Just above the location of wooden peg 21 a washer 24 is placed between the head of screw 22 and the turkey body 12 to prevent the screw head from damaging or pulling into bird body 12 as screw 22 is tightened to secure tube 16 to turkey body 12. Of course, other known attachment methods will suffice to effect connection of tube 16 to body 12.

Preferably at least ½ inch upwardly on lower end 20 of pipe 16 are paired opposed apertures 26 which are sized, for example, with a diameter ⅛th-inch, so as to permit passage therethrough of a pin 30 having shaft 28. Pin 30 may be formed of any convenient material, but is preferably plastic, so as to be light-weight and inexpensive and should be brown, or some other dark color, for camouflage. Shaft 28 is further provided at one end with an integral head 32 which prevents complete passage of pin 30 through paired apertures 26 and also provides a site for attachment of a string or fine cord 34. For example, pin 30 may be formed of a commonly available plastic hair roller securement pin which has been painted brown. A small hole 33 approximately 1/16th-inch in diameter may be formed in head 32 of the pin to serve as a site for attaching cord 34. Alternatively, a small, straight cotter pin may be used. If desired a light coating of grease or wax may be applied to shaft 28 of pin 30 to facilitate selective release from the position thereof in apertures 26 of pipe 16.

Cord 34 has one free end 36 for use as later described and is desirably made of brown fishing line or some other dark, light-weight, strong, elongated substance. Attachment of cord 34 to pin 30 is made approximately ten inches from free end 36 and the remainder of cord 34 may be stored conveniently on a reel (not shown), or otherwise, for retention by the user of decoy 10. Although cord 34 is illustrated as being set up for operation from behind decoy 10, it may be placed otherwise. For example, the hunter may wish to be positioned forwardly of decoy 10 for optimal positioning should a tom turkey begin to "strut" in front of the hen decoy.

Lower end 20 of pipe 16 has journaled therein an upper and 38 of a smaller polyvinylchloride pipe 40. Pipe 40 is approximately ⅜ths inch in diameter and when positioned for normal function of decoy 10 extends from upper end 38 vertically downwardly, for a distance of about one to two feet to lower end 42.

Located inwardly, approximately 1⅛th-inches from upper end 38 of pipe 40 are paired opposed apertures 44 which are also sized at about ⅛th of an inch for receipt of shaft 28 of pin 30. To releasably secure pipe 16 to and coaxially outwardly of pipe 40 at upper end 38, paired apertures 26 in pipe 16 are aligned with corresponding paired apertures 44 in pipe 40 and simultaneously penetrated by shaft 28 of pin 30.

Figure 3:
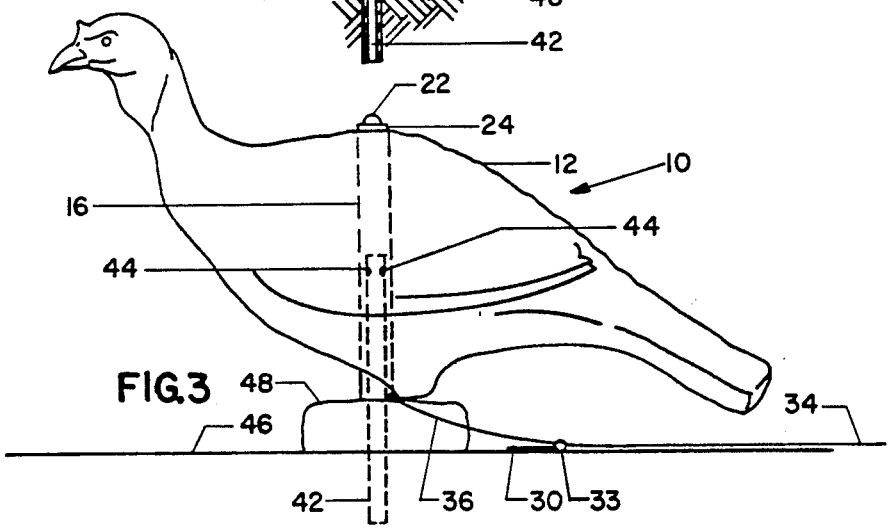
FIG. 3 is a side elevational view of the decoy of FIG. 1, in mating position, showing the support mechanism in phantom.

When decoy 10 is in normal operating position lower end 42 of pipe 40 is firmly embedded in the ground 46, for example, by at least six inches, and a cushion 48, centrally penetrated by pipe 40, is disposed on ground 46 directly beneath turkey body 12 so as to provide a resting site for turkey body 12 when the latter is in mating position as shown in FIG. 3. Cushion 48 is preferably formed of a green sponge or other soft material colored for a camouflage effect and having a diameter of about six inches and a thickness of approximately four inches.

Firmly secured to pipe 40, just above cushion 48, is free end 36 of cord 34. So attached, cord 34 is at all times in contact with decoy 10, so as not to become lost or unnecessarily tangled. The other end (unseen) of cord 34 is retained by the user for selective operation of decoy 10.

Figure 2:
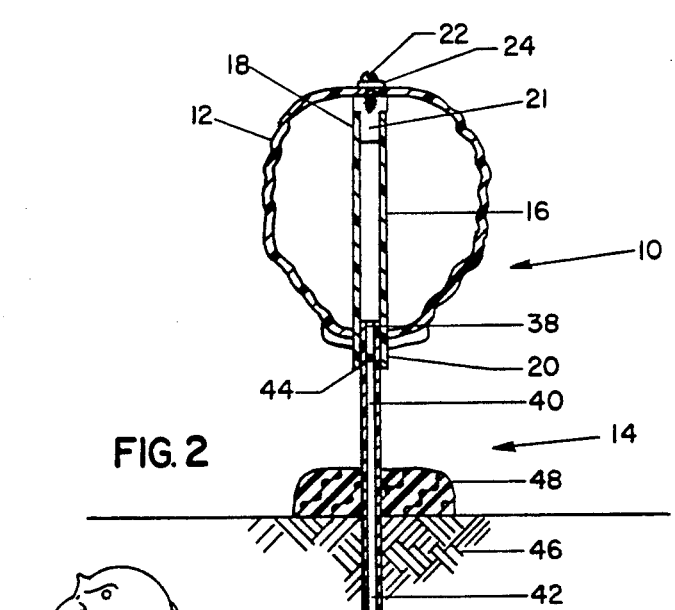
FIG. 2 is a vertical sectional view taken on line 2—2 of FIG. 1.

Thus, in use it is a simple matter for a turkey hunter to carry the light-weight decoy 10 in its entirety to a particular clearing or other selected site and to set up decoy 10 as described and shown in FIGS. 1 and 2. Thereafter the hunter retains and unwinds at least a portion of the remainder of cord 34, as required, and secrets himself or herself from view. So hidden, the hunter may then wait silently or use an audible turkey call to attract turkeys to the hunting site. When the hunter becomes aware that a hung-up tom turkey is waivering in the underbrush, indecisive about approaching the hen decoy 10, it is a simple matter to remotely release pin 30 by a quick, slight tug on cord 34. Pipe 16 coaxially surrounds but is unattached in relation to pipe 40 once pin 30 exits paired apertures 26, 44, so that the weight of turkey body 12 causes it to suddenly drop in a nearly silent manner onto cushion 48.

Turkey decoy 10 is then in the position shown in FIG. 3, mimicking the normal mating position of a hen turkey, in order to mislead the tom that the true object of its affections eagerly awaits. So fooled, subject tom will rush into the clearing to meet his fate.

Turkey decoy 10 has been successfully tested in the field and is expected to meet with a high degree of consumer demand as the popularity of turkey hunting continues to increase worldwide. The new decoy is expected to be particularly successful, in part, because of its simplicity. Also, it can be formed inexpensively from readily available elements which are strong, yet light-weight and easily assembled with a minimum of instructions. As is readily apparent, the above-described construction and sizes and materials of the various elements are preferred, for the most realistic appearance, both in form and function, but other materials and slight variations in measurements will not interfere significantly with the appearance and performance of the new turkey decoy 10. It is the sudden, selective, quiet straight, non-pivotal vertical dropping of the hen turkey decoy body, simulating mating behavior, which is the essence of the new decoy 10, and it is understood that such may also be satisfactorily accomplished by slight variations or combinations of known elements, although the above described construction is preferred. For example, it is conceivable that decoy 10 could be constructed for electronically remotely controlling the vertical dropping movement of turkey body 12, and even providing for automated return to the standing position. However, such a construction is not preferred because of the inherent disadvantages of increased expense, noise and wear of moving parts.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A turkey decoy adapted for imitation of the mating behavior of a hen turkey, said decoy comprising a hen turkey body portion adapted for mounting on a support mechanism, and a support mechanism having said hen turkey body portion mounted thereon in a standing position and further having means for selectively causing hen turkey body portion to suddenly vertically drop straight downward in a non-pivotal fashion, to alter the standing position of said hen turkey body portion to a mating position to thereby attract male turkeys.

2. The turkey decoy of claim 1, wherein said support mechanism is adapted for manually remotely selectively altering the standing position of said hen turkey body portion.

3. The turkey decoy of claim 1, wherein said hen turkey body portion is substantially life-sized and colored so as to imitate the coloring of a wild hen turkey.

4. The turkey decoy of claim 1, wherein said support mechanism comprises first and second elongated members, said first elongated member passing vertically, substantially centrally through said hen turkey body portion and being fixed thereto, said second elongated member being secured vertically to the ground and interconnecting with said first elongated member in releasably secured fashion, to thereby provide a means for presenting said hen turkey body portion in a standing position which is selectively altered to a mating position by selectively releasing the interconnection of said first elongated member to said second elongated member.

5. The turkey decoy of claim 4, wherein said first and second elongated members are interconnected coaxially.

6. The turkey decoy of claim 5, wherein said first elongated member is a pipe of sufficient diameter to receive said second elongated member slidingly therein, and further wherein said first and second elongated members have interconnecting ends, each of said interconnecting ends having opposed, paired apertures for receipt therethrough of a pin to releasably secure said first elongated member to said second elongated member, said pin having a cord attached thereto for effecting the release of said pin from said paired opposed apertures of said first and second elongated members to thereby selectively alter the position of said hen turkey body portion from a standing position to a mating position.

7. The turkey decoy of claim 6, wherein said second elongated member is a pipe and said first and second elongated members are both formed of polyvinylchloride.

8. The turkey decoy of claim 1, and further comprising a cushion disposed beneath said hen turkey body portion to thereby effect a relatively silent transition of said hen turkey body portion from a standing position to a mating position.

* * * * *